(12) United States Patent
Fukami

(10) Patent No.: US 11,359,634 B2
(45) Date of Patent: Jun. 14, 2022

(54) VACUUM PUMP AND TEMPERATURE CONTROL DEVICE

(71) Applicant: Edwards Japan Limited, Yachiyo (JP)

(72) Inventor: Hideo Fukami, Yachiyo (JP)

(73) Assignee: Edwards Japan Limited, Yachiyo (JP)

(*) Notice: Subject to any disclaimer, the term of this patent is extended or adjusted under 35 U.S.C. 154(b) by 0 days.

(21) Appl. No.: 17/251,029

(22) PCT Filed: Jun. 3, 2019

(86) PCT No.: PCT/JP2019/021925
§ 371 (c)(1),
(2) Date: Dec. 10, 2020

(87) PCT Pub. No.: WO2019/239934
PCT Pub. Date: Dec. 19, 2019

(65) Prior Publication Data
US 2021/0172446 A1    Jun. 10, 2021

(30) Foreign Application Priority Data
Jun. 15, 2018   (JP) .............................. JP2018-114954

(51) Int. Cl.
*F04D 19/04*     (2006.01)
*F04D 29/58*     (2006.01)
*F04D 29/058*    (2006.01)

(52) U.S. Cl.
CPC ......... *F04D 19/042* (2013.01); *F04D 29/584* (2013.01); *F04D 29/058* (2013.01); *F05D 2270/303* (2013.01); *F16C 2360/45* (2013.01)

(58) Field of Classification Search
None
See application file for complete search history.

(56) References Cited

U.S. PATENT DOCUMENTS 6,644,938 B2 *  11/2003  Omori .................. F16C 37/005
                                                    417/353
10,001,126 B2 *  6/2018  Miwata ................ F04D 29/584
(Continued)

FOREIGN PATENT DOCUMENTS

JP     2002-257079 A    9/2002
JP     2006017089 A     1/2006
(Continued)

OTHER PUBLICATIONS

Original and Translation of International Search Report dated Aug. 13, 2019 in counterpart International Application No. PCT/JP2019/021925, 7 pp.

(Continued)

*Primary Examiner* — Igor Kershteyn
*Assistant Examiner* — Jason Fountain
(74) *Attorney, Agent, or Firm* — Shumaker & Sieffert, P.A.

(57) ABSTRACT

A vacuum pump and a temperature control device are capable of preventing, with a simple configuration, overheating and overcooling of a pump that are caused due to abnormality in a temperature sensor used to control a heater or a water-cooling solenoid valve that is provided to prevent the deposition of products. Problems such as overheating and overcooling of a heater can be avoided in a case where a temperature sensor system fails and consequently the measured temperature continues to be constant between the upper limit and the lower limit. TMS function controls the measured temperature of the temperature sensor to a target temperature. Thus, if an application such as a target to be heated or a heater capacity is identified, the same cycles of turning ON/OFF of the heater or the water-cooling solenoid valve are repeated, and the upper limit of the time in which the ON/OFF state is sustained continuously is determined.

(Continued)

An allowed time considering a margin is provided for this upper limit, and the ON/OFF state is changed so that the ON state or the OFF state is not continuously sustained beyond the allowed time.

3 Claims, 7 Drawing Sheets

(56) References Cited

U.S. PATENT DOCUMENTS

| | | | |
|---|---|---|---|
| 10,054,114 B2* | 8/2018 | Kimura | F04B 37/08 |
| 10,753,363 B2* | 8/2020 | Kozaki | F04D 29/058 |
| 2002/0131877 A1* | 9/2002 | Omori | F04D 29/5813 |
| | | | 417/353 |
| 2011/0016890 A1* | 1/2011 | Kimura | F04B 49/065 |
| | | | 62/157 |
| 2012/0143390 A1* | 6/2012 | Miwata | F04D 29/584 |
| | | | 700/300 |
| 2017/0306967 A1* | 10/2017 | Kozaki | F04D 17/168 |

FOREIGN PATENT DOCUMENTS

| | | |
|---|---|---|
| JP | 2006037739 A | 2/2006 |
| WO | 2011021428 A1 | 2/2011 |

OTHER PUBLICATIONS

Extended Search Report from counterpart European Application No. 19820034.7 dated Feb. 8, 2022, 7 pp.

* cited by examiner

VACUUM PUMP AND TEMPERATURE CONTROL DEVICE

This application is a U.S. national phase application under 35 U.S.C. § 371 of international application number PCT/JP2019/021925 filed on Jun. 3, 2019, which claims the benefit of priority to JP application number 2018-114954 filed Jun. 15, 2018. The entire contents of each of international application number PCT/JP2019/021925 and JP application number 2018-114954 are incorporated herein by reference.

TECHNICAL FIELD

The present disclosure relates to a vacuum pump and a temperature control device, and particular to a vacuum pump and a temperature control device capable of preventing, with a simple configuration, overheating and overcooling of a pump that are caused due to abnormality in a temperature sensor used to control a heater or a water-cooling solenoid valve that is provided to prevent the deposition of products.

BACKGROUND

With the recent development of electronics, the demand for semiconductors such as memories and integrated circuits has been increasing rapidly.

These semiconductors are manufactured by providing electrical properties by doping extremely pure semiconductor substrates with impurities or by forming a fine circuit on a semiconductor substrate by means of etching.

These tasks need to be performed in a chamber in a high vacuum state in order to avoid the impact of dust and the like in the air. Typically a vacuum pump is used to exhaust the chamber, and particularly a turbomolecular pump, which is a type of a vacuum pump, is often used less from the perspective of gas and easy maintenance.

Furthermore, the process of manufacturing a semiconductor includes many steps of causing various process gases to act on a semiconductor substrate, wherein a turbomolecular pump is used not only to make the chamber vacuum, but also to exhaust these process gases from the chamber.

Incidentally, the process gases may be introduced into the chamber at a high temperature in order to increase the reactivity. These process gases may become solid once these process gases are cooled to a certain temperature at the time of exhaustion, and thereby deposit products in an exhaust system. Subsequently, these types of process gases may become solid upon reaching a low temperature within the turbomolecular pump, and consequently adhere to and accumulate on the inside of the turbomolecular pump.

When the deposits of the process gases accumulate inside the turbomolecular pump, these accumulated products narrow a pump flow path, reducing the performance of the turbomolecular pump.

In order to solve this problem, conventionally, a heater or an annular water cooling pipe is wrapped around an outer circumference of a base portion or the like of the turbomolecular pump, and, for example, a temperature sensor is embedded in the base portion or the like, wherein the base portion is heated by the heater or cooled by the water cooling pipe to keep the temperature of the base portion in a constant range of high temperatures on the basis of a signal from the temperature sensor (temperature management system (hereinafter referred to as TMS)) (see Japanese Patent Application Publication No. 2002-257079 and Japanese Patent No. 5782378).

Because the higher the control temperature by the TMS, the more difficult it is for the products to accumulate, it is preferred that the temperature of the base portion be as high as possible.

On the other hand, when the temperature of the base portion is high, an electronic circuit provided in the main body of the turbomolecular pump exceeds a limit temperature in a case where, for example, due to changing to the high temperature of the electronic circuit with a case the exhaust load fluctuates or the ambient temperature becomes high, possibly destroying a storage means of a semiconductor memory. In such a case, the semiconductor memory is destroyed, resulting in loss of maintenance information data such as pump startup time and error history.

Loss of the maintenance information data makes it impossible to determine when to perform maintenance and inspection or when to replace the turbomolecular pump. Consequently, a major problem occurs in the operation of the turbomolecular pump. For this reason, the base portion is cooled by the water cooling pipe when the temperature of the base portion exceeds a predetermined temperature.

An example of the TMS control is illustrated in a flowchart in FIG. 7 and a timing chart in FIG. 8. In the timing chart in FIG. 8, the horizontal axis represents the times at which the heater is controlled and the vertical axis represents temperature values measured by the temperature sensor. The ON state and the OFF state of the heater are also shown on the vertical axis. Note that opening and closing of the solenoid valve for controlling the flow of water into the water cooling pipe take place in the form of control by a temperature sensor, independent of the control of the heater, the temperature sensor being provided separately. However, since this control method of the solenoid valve is the same as the control of the heater, a flowchart and a timing chart for the control of the solenoid valve are omitted herein.

In this example, the temperature of the base portion of the turbo molecular pump is measured by the temperature sensor, and a heating command is sent to the heater or the solenoid valve is opened and closed to control the flow of water into the water cooling pipe, so that the measured temperature becomes equal to or lower than an allowable temperature of the base portion that is set in advance.

In other words, in FIGS. 7 and 8, after the operation starts, the control device turns the heater ON during an initial stage up to time t2 and continues to heat the base portion. At this moment, the processing is performed by a control CPU on the basis of the flowchart illustrated in FIG. 7. Specifically, the TMS control is activated according to this flowchart, every certain sampling cycle Δt. First, up to time t1, the control of the heater begins in step 1 (abbreviated as S1 in the diagram, and the same applies hereinafter), and since the temperature measured by the temperature sensor is determined to be lower than a lower limit in step 2, the heater is turned ON in step 3, and then the control ends in step 4. This operation is repeated for the control performed every sampling cycle Δt up to time t1.

During the sampling cycle Δt from time t1 to time t2, the control of the heater begins in step 1, and in step 2, since the temperature measured by the temperature sensor is determined to be equal to or higher than the lower limit, the processing proceeds to step 5. However, in step 5, since the measured temperature is lower than an upper limit, the processing proceeds to step 4 where the control is ended. That is, until time t2 where the upper limit is reached, the heater remains ON and continues to be heated.

In step 5, it is determined that the measured temperature exceeds the upper limit for the first time at time t2. Thus, the processing proceeds to step 6 where the heater is turned OFF.

In view of the heat capacity even after the heater is turned OFF at the upper limit, the temperature of the base portion does not drop suddenly, resulting in drawing an overshoot curve. On the other hand, around the time when the measured temperature exceeds the upper limit, the control of the solenoid valve is performed separately, in which the solenoid valve is opened and water is supplied from the water cooling pipe.

After the overshoot, during the sampling cycle Δt up to time t3, it is determined in step 2 that the measured temperature is not lower than the lower limit and in step 5 that the measured temperature is not higher than the upper limit; the processing proceeds to step 4. Thus, the heater remains OFF.

Then, when the temperature of the base portion becomes lower than the lower limit at time t3, it is determined in step 2 that the temperature of the base portion is lower than the lower limit, and the processing proceeds to step 3 where the heater is turned ON again. Around the time when the temperature of the base portion becomes lower than the lower limit, the solenoid valve is closed by the solenoid valve control that is carried out separately.

SUMMARY

Incidentally, in some cases a thermistor is used as the temperature sensor in order to perform the TMS control. In such a case, when a cable breaks, the resistance value of the thermistor becomes infinite. At that time, a temperature of, for example, −150 degrees is detected as the temperature value obtained by converting the resistance value into a voltage. On the other hand, when the cable shorts out, the resistance value becomes zero, and an abnormal temperature of, for example, 600 degrees is detected as the voltage-converted temperature value.

Furthermore, in a case where the temperature sensor is not placed correctly due to, for example, a gap formed between the temperature sensor and a wall portion of the pump or a short circuit caused via the aluminum of the wall portion, the measured temperature value may not be a specific value as described above.

Additionally, in a case where the temperature sensor uses serial communication, the temperature may be locked to the last measured temperature when the temperature sensor system has malfunctioned.

If the TMS control continues without being able to detect such circumstances, overheating, overcooling or the like of the pump occurs, resulting in impairment of the function of the pump.

The present disclosure has been contrived in view of these problems of the prior art, and an object thereof is to provide a vacuum pump and a temperature control device that are capable of preventing, with a simple configuration, overheating and overcooling of a pump that are caused due to abnormality in a temperature sensor used to control a heater or a water-cooling solenoid valve that is provided to prevent the deposition of products.

Thus, the present disclosure is a disclosure of a vacuum pump, including: a temperature sensor that measures a temperature of a pump; and temperature control that controls a heater and/or a cooling device in such a manner that the temperature measured by the temperature sensor repeatedly changes back and forth between an upper limit and a lower limit, wherein the temperature control has a specified time that is set so as to include an elapsed time in which the temperature changes from the upper limit to the lower limit following said upper limit and an elapsed time in which the temperature changes from the lower limit to the upper limit following said upper limit during a normal operation of the vacuum pump, and, when the specified time elapses without confirming a change in a state of the upper limit or the lower limit, the temperature control forcibly controls the heater and/or the cooling device to change the state and/or to notify abnormality.

In the temperature control, the specified time is set so as to include an elapsed time in which the temperature changes from the upper limit to the next lower limit and an elapsed time in which the temperature changes from the lower limit to the next upper limit during the normal operation.

When the temperature sensor operates normally, the control is performed repeatedly between the upper limit and the lower limit. For this reason, the specified time is not exceeded.

However, when the specified time is exceeded without being able to confirm the change in the state of the upper limit or lower limit, it is determined that abnormality has occurred in a temperature sensor system. In this case, the control of the heater and/or the cooling device is forcibly carried out, to change the state of the upper limit or the lower limit. As a result, the operation of the pump can be sustained safely. In addition, the abnormality can be notified. The determination can be realized by means of software processing without the need for a separate temperature sensor for monitoring abnormality.

Furthermore, the present disclosure is a disclosure of a vacuum pump, wherein the specified time is set so as to include an elapsed time in which the temperature is lower than the lower limit, and an elapsed time in which the temperature exceeds the upper limit.

Not only can a risk of failure in the temperature sensor system arise between the two temperature thresholds of the upper limit and the lower limit, but also failure of the temperature sensor system is conceivable even in areas where the measured temperature is lower than the lower limit and areas where the measured temperature is higher than the upper limit. Thus, breakage of the temperature sensor system can be detected in all temperature ranges.

Furthermore, the present disclosure is a disclosure of a temperature control device that controls an object to be temperature-controlled, a temperature sensor that measures a temperature of the object, and, so that the temperature measured by the temperature sensor repeatedly changes back and forth between an upper limit and a lower limit, a heater and/or a cooling device, wherein the temperature control device has a specified time that is set so as to include an elapsed time in which the temperature changes from the upper limit to the lower limit following said upper limit and an elapsed time in which the temperature changes from the lower limit to the upper limit following said lower limit during a normal operation, and, when the specified time elapses without confirming a change in a state of the upper limit or the lower limit, the temperature control device forcibly controls the heater and/or the cooling device to change the state and/or to notify abnormality.

According to the present disclosure described above, when the specified time elapses without confirming a change in the state of the upper limit and/or the lower limit, the temperature control forcibly controls the heater and/or the cooling device to change the state and/or to notify the abnormality. Thus, the operation of the pump can be sustained safely. In addition, abnormality can be notified. The determination can be realized by means of software processing without the need for a separate temperature sensor for monitoring abnormality.

DETAILED DESCRIPTION

Embodiments of the present disclosure are now described hereinafter. A system configuration diagram of a heater system according to an embodiment of the present invention is illustrated in FIG. 1, and a configuration diagram of a turbomolecular pump is illustrated in FIG. 2.

Figure 1:
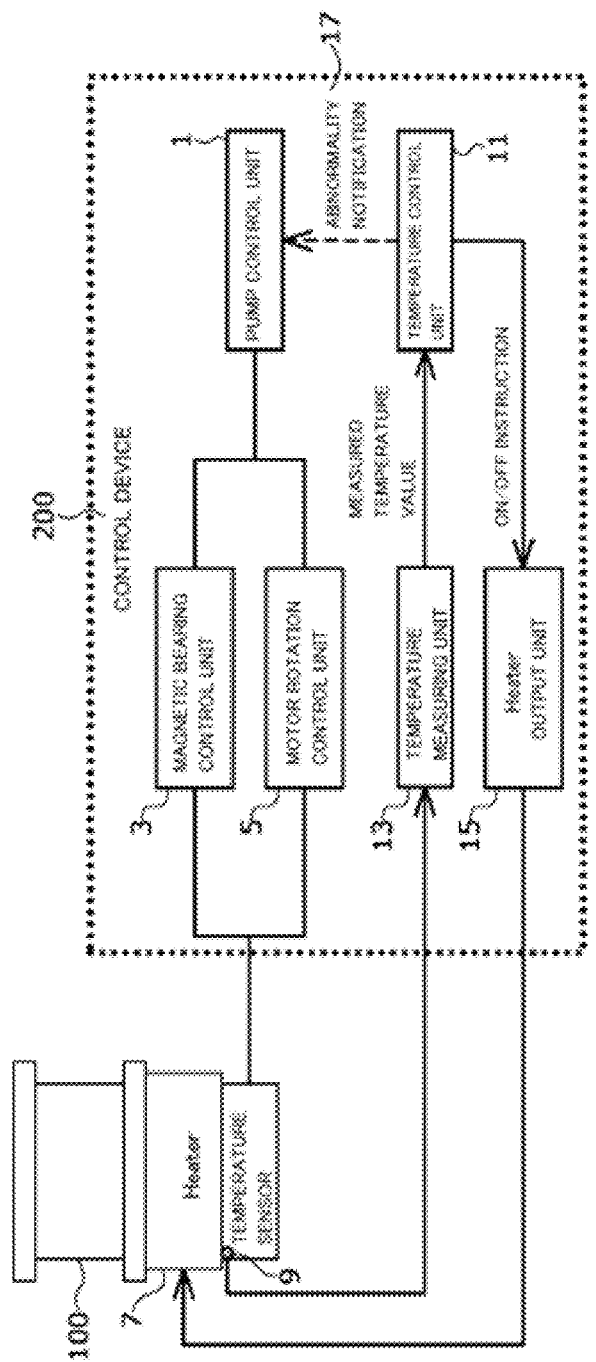
FIG. 1 is a system configuration diagram of a heater system according to an embodiment of the present disclosure.
Figure 2:
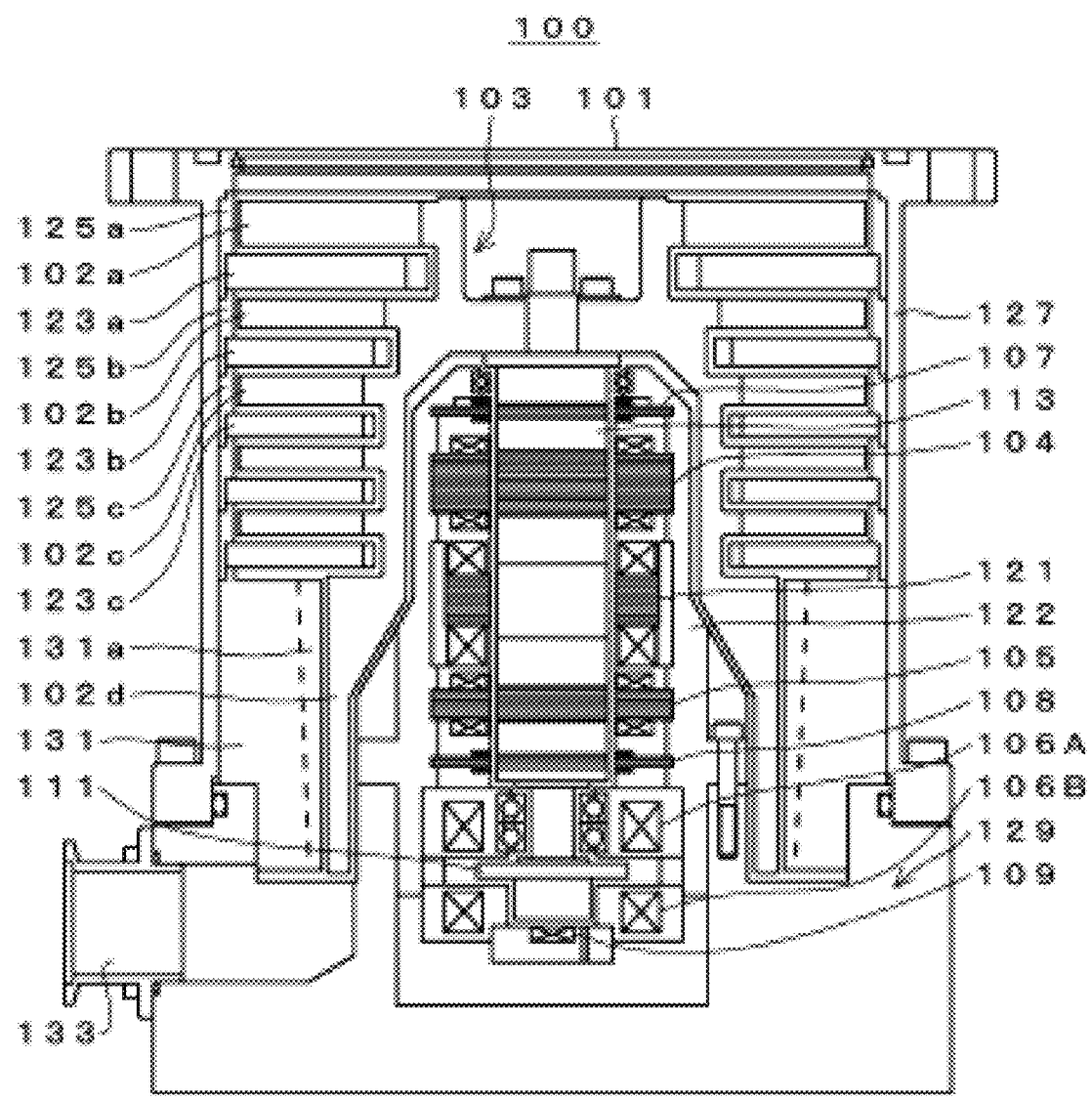
FIG. 2 is a configuration diagram of a turbomolecular pump.

In FIG. 1, a control device 200 is illustrated separately from a pump body 100, but the present embodiment can be applied to the turbomolecular pump even if the pump body 100 and the control device 200 are integrated with each other.

A pump control unit 1 for controlling the pump is disposed in the control device 200. The pump control unit 1 monitors and controls a magnetic bearing control unit 3 that controls a magnetic bearing and a motor rotation control unit 5 that controls a motor. A heater 7 is wrapped around a base portion 129 of the pump body 100, which will be described hereinafter, and a temperature sensor 9 for detecting the temperature of the base portion 129 is disposed in the vicinity of the heater 7. A temperature control unit 11 for performing TMS control is disposed in the control device 200. The temperature control unit 11 converts the temperature detected by the temperature sensor 9 to a predetermined temperature signal at a temperature measuring unit 13, and inputs the temperature signal as a measured temperature value. When the measured temperature value exceeds a threshold, which will be described hereinafter, an ON/OFF signal is generated, and this ON/OFF signal is output to a heater output unit 15. The heater output unit 15 is configured to start heating by the heater 7 or turn off the heating on the basis of the input ON/OFF signal. When the temperature control unit 11 detects abnormality in the temperature sensor system, an abnormality notification signal 17 is issued to the pump control unit 1.

Note that, although the present embodiment describes the system configuration diagram of the heater system, the same configuration can be applied to a system configuration diagram of a solenoid valve system.

The pump body 100 is described next.

In FIG. 2, an inlet port 101 is formed at an upper end of a cylindrical outer cylinder 127 of the pump body 100. The inside of the outer cylinder 127 is provided with a rotating body 103 in which a plurality of rotor blades 102a, 102b, 102c etc. configured as turbine blades for sucking and exhausting a gas are formed radially and in multiple stages around the rotating body 103.

A rotor shaft 113 is attached to the center of the rotating body 103. The rotor shaft 113 is supported afloat in the air and has the position thereof controlled by, for example, so-called 5-axis control magnetic bearings.

An upper radial electromagnet 104 has four electromagnets arranged in pairs along an X-axis and a Y-axis that are radial coordinate axes of the rotor shaft 113 and are orthogonal to each other. An upper radial sensor 107 consisting of four electromagnets is provided in the vicinity of the upper radial electromagnet 104 in such a manner as to correspond thereto. The upper radial sensor 107 is configured to detect a radial displacement of the rotor shaft 113 and send the detected radial displacement to the control device 200.

On the basis of the displacement signal detected by the upper radial sensor 107, the control device 200 controls the excitation of the upper radial electromagnet 104 via a compensating circuit having a PID adjustment function, and adjusts the upper radial position of the rotor shaft 113.

The rotor shaft 113 is formed of a high magnetic permeability material (such as iron) and therefore configured to be drawn by the magnetic force of the upper radial electromagnet 104. Such adjustment is performed in the X-axis direction and the Y-axis direction independently.

Moreover, a lower radial electromagnet 105 and a lower radial sensor 108 are arranged in a similar manner to the upper radial electromagnet 104 and the upper radial sensor 107, to adjusts the lower radial position of the rotor shaft 113 similarly to the upper radial position.

Furthermore, axial electromagnets 106A, 106B are arranged vertically across a disc-shaped metal disc 111 provided at a lower portion of the rotor shaft 113. The metal disc 111 is made of a high magnetic permeability material such as iron. An axial sensor 109 is provided to detect the axial displacement of the rotor shaft 113, and an axial displacement signal thereof is transmitted to the control device 200.

On the basis of the axial displacement signal, the axial electromagnets 106A, 106B have the excitation thereof controlled via the compensating circuit of the control device 200 having the PID adjustment function. The axial electromagnet 106A and the axial electromagnet 106B use the magnetic forces thereof to draw the metal disc 111 upward and downward, respectively.

In this manner, the control device 200 appropriately adjusts the magnetic forces applied to the metal disc 111 by the axial electromagnets 106A, 106B and magnetically levitates the rotor shaft 113 in the axial direction, to hold the rotor shaft 113 in space in a non-contact manner.

A motor 121 is provided with a plurality of magnetic poles arranged in a circle so as to surround the rotor shaft 113. Each magnetic pole is controlled by the control device 200 in such a manner as to drive the rotor shaft 113 to rotate via an electromagnetic force acting between each magnetic pole and the rotor shaft 113.

The rotor blades 102a, 102b, 102c etc. and a plurality of stator blades 123a, 123b, 123c etc. are arranged, with a small gap therebetween. The rotor blades 102a, 102b, 102c etc. are tilted by a predetermined angle, from plane perpendicular to the axis of the rotor shaft 113, in order to transfer the molecules of the exhaust gas downward by colliding therewith.

The stator blades 123 are tilted as well by a predetermined angle from a plane perpendicular to the axis of the rotor shaft 113, and are arranged so as to alternate with the rotor blades 102, facing toward the inside of the outer cylinder 127.

One ends of the respective stator blades 123 are supported while being inserted between a plurality of stacked stator blade spacers 125a, 125b, 125c etc.

The stator blade spacers 125 are each a ring-shaped member, and made of metal such as aluminum, iron, stainless steel, copper, or an alloy containing these metals as components.

The outer cylinder 127 is fixed to outer circumferences of the stator blade spacers 125, with a small gap therebetween. The base portion 129 is disposed at the bottom of the outer cylinder 127, and a threaded spacer 131 is disposed between a lower portion of the stator blade spacers 125 and the base portion 129. An outlet port 133 is formed in a lower portion of the threaded spacer 131 inside the base portion 129, and is communicated with the outside.

The threaded spacer 131 is a cylindrical member made of metal such as aluminum, copper, stainless steel, iron, or an alloy containing these metals as components, wherein a plurality of spiral thread grooves 131a are engraved on an inner peripheral surface of the threaded spacer 131.

The direction of the spiral of the thread grooves 131a is a direction in which the molecules of the exhaust gas are transferred toward the outlet port 133 when the molecules of the exhaust gas move in the direction of rotation of the rotating body 103.

A cylindrical portion 102d hangs down at the bottom portion following the rotor blades 102a, 102b, 102c etc. of the rotating body 103. An outer peripheral surface of the cylindrical portion 102d is cylindrical, protrudes toward the inner peripheral surface of the threaded spacer 131, and is positioned close to the inner peripheral surface of the threaded spacer 131 with a predetermined gap therebetween.

The base portion 129 is a disk-shaped member that configures a bottom portion of the pump body 100 of the turbomolecular pump and is generally made of metal such as iron, aluminum, or stainless steel. In addition, a water cooling pipe, not illustrated, is buried in an annular shape in the base portion 129. Also, a temperature sensor for water cooling, not illustrated, is disposed on a side of the water cooling pipe.

Since the base portion 129 not only physically holds the pump body 100 but also functions as a heat conduction path, it is preferred that metal that is rigid and has high thermal conductivity such as iron, aluminum, or copper be used.

According to this configuration, when the rotor blades 102 are driven by the motor 121 to rotate along with the rotor shaft 113, the exhaust gas from a chamber is sucked through the inlet port 101, due to the action of the rotor blades 102 and the stator blades 123.

The exhaust gas sucked from the inlet port 101 is transferred to the base portion 129 through the gaps between the rotor blades 102 and the stator blades 123. At this moment, the temperature of the rotor blades 102 rises due to frictional heat that is generated when the exhaust gas comes into contact with or collides with the rotor blades 102 or the conduction and radiation of the heat generated in the motor 121, and the resultant heat of the rotor blades 102 is transmitted toward the stator blades 123 by being radiated or conducted by the gas molecules of the exhaust gas or the like.

The stator blade spacers 125 are joined to each other at outer peripheral portions thereof, and transmit the heat received by the stator blades 123 from the rotor blades 102 and the frictional heat generated when the exhaust gas comes into contact with or collides with the stator blades 123, to the outer cylinder 127 and the threaded spacer 131.

The exhaust gas that has been transferred to the threaded spacer 131 is then sent to the outlet port 133 while being guided by the thread grooves 131a.

Actions of the present embodiment are described next.

Figure 3:
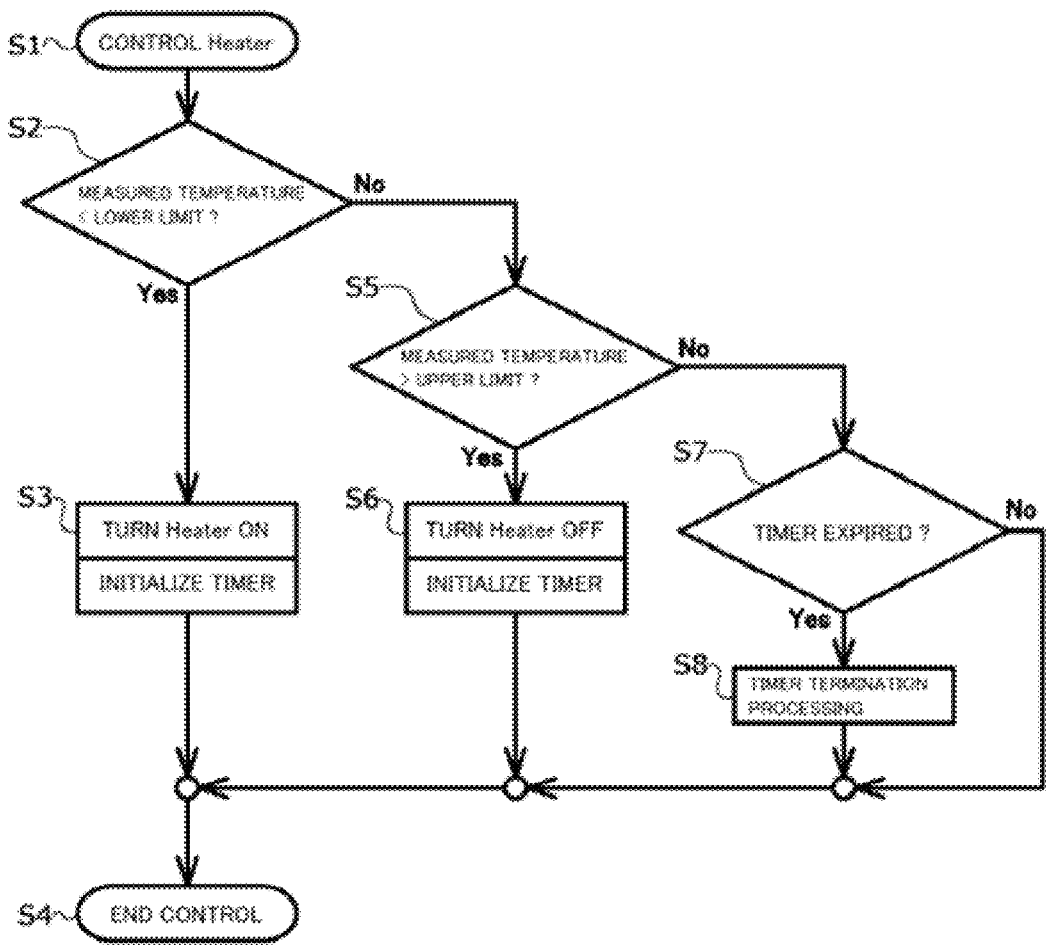
FIG. 3 is a flowchart of TMS control according to the present embodiment.
Figure 4:
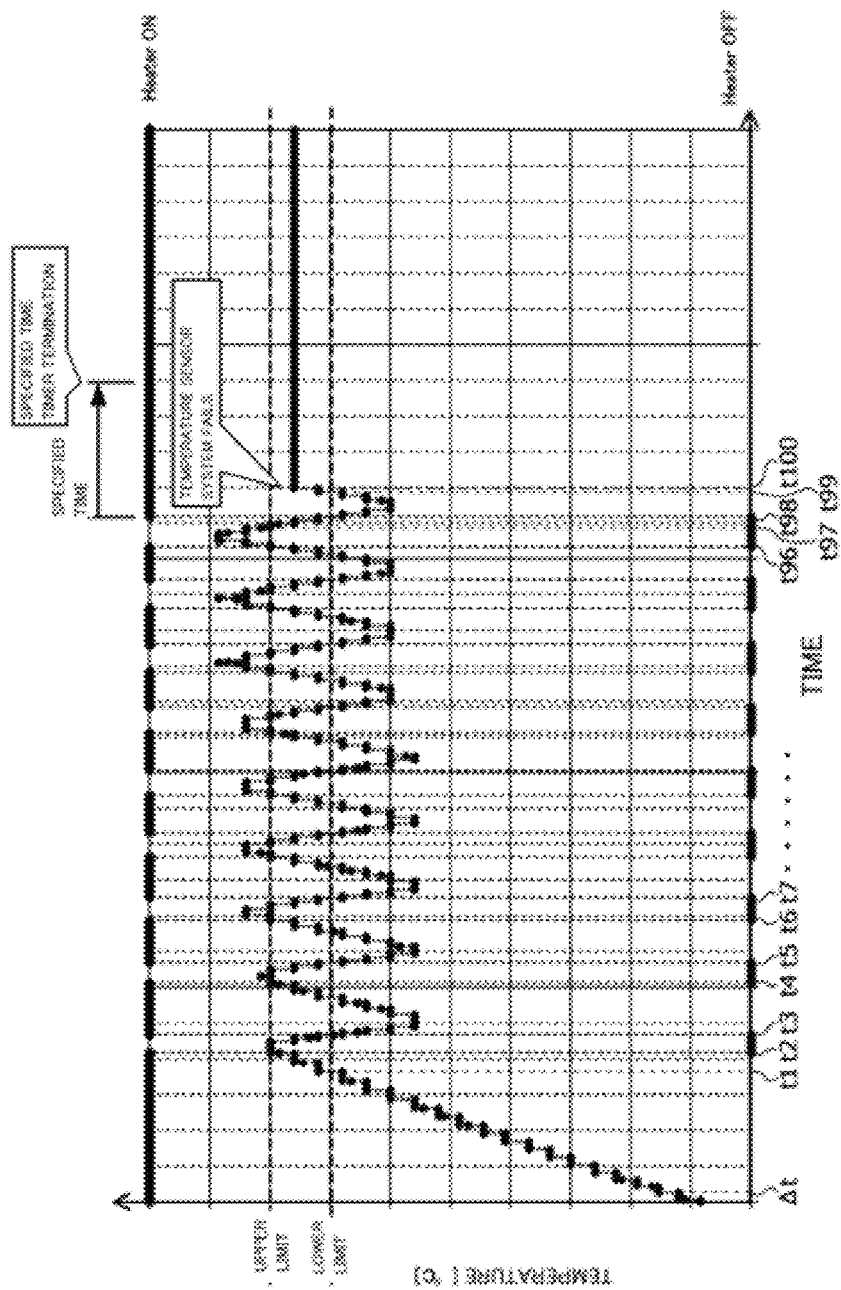
FIG. 4 is a timing chart of TMS control performed when a temperature sensor system fails.
Figure 7:
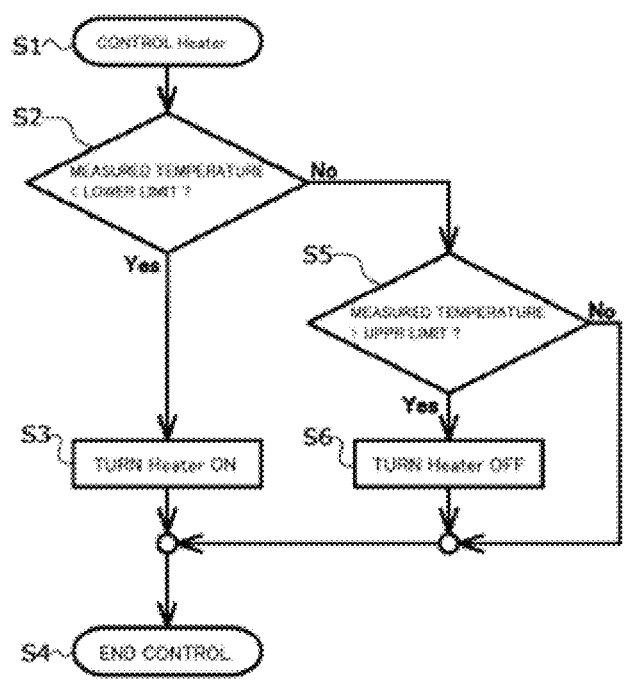
FIG. 7 is a flowchart illustrating an example of TMS control (prior art).
Figure 8:
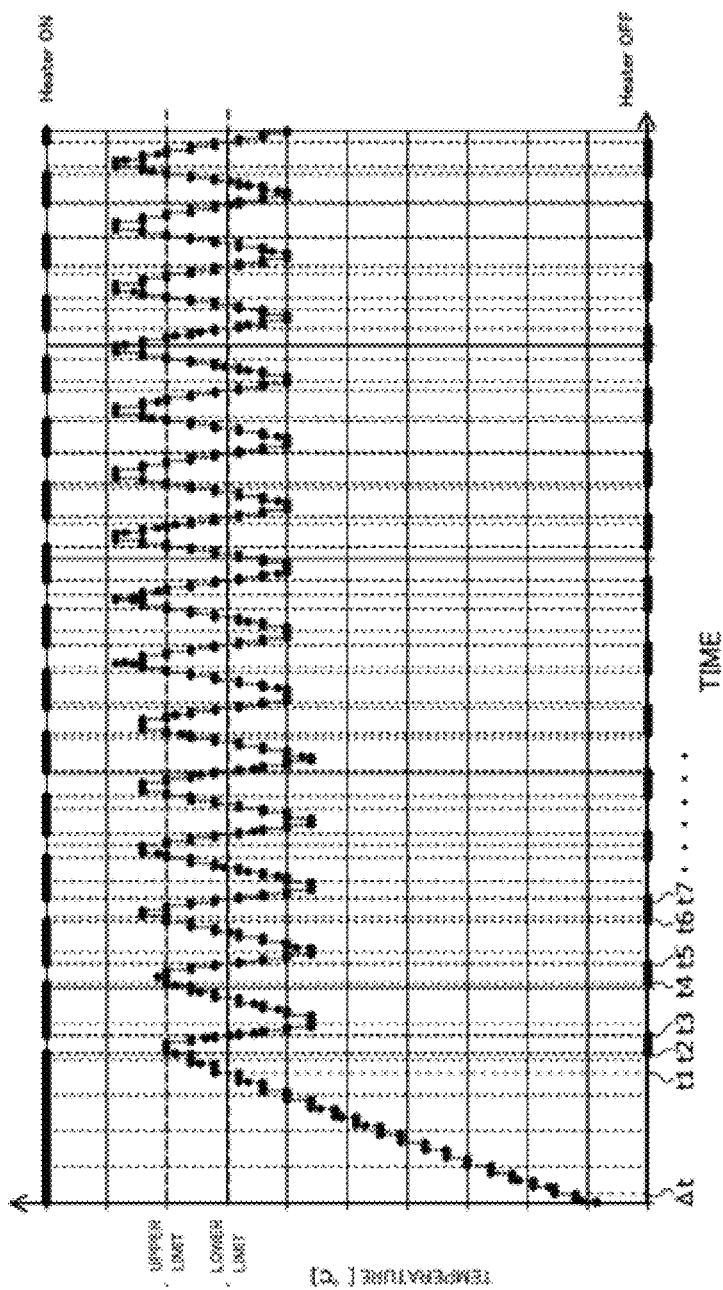
FIG. 8 is a timing chart illustrating an example of TMS control (prior art).

FIG. 3 is a flowchart of TMS control according to the present embodiment. FIG. 4 is a timing chart of TMS control performed when the temperature sensor system fails. Note that the same components as those illustrated in FIGS. 7 and 8 are given the same reference numerals; the descriptions thereof are omitted accordingly.

For example, in controlling the heater, generally two temperature thresholds, i.e., an upper limit and a lower limit, are set in order to avoid ON/OFF chattering of the heater, wherein the heater 7 is turned ON when the measured temperature is equal to or lower than the lower limit, and the heater 7 is turned OFF when the measured temperature is equal to or higher than the upper limit. In a case where the temperature sensor 9 fails when the measured temperature is equal to or lower than the lower limit, "low temperature abnormality" is detected, and in a case where the temperature sensor 9 fails when the measured temperature is equal to or higher than the upper limit, "high temperature abnormality" is detected.

In a case where the temperature sensor 9 fails when the measured temperature is between the upper limit and the lower limit, abnormality cannot be detected conventionally. However, if it is impossible in actual operation to keep a constant temperature in this temperature range, in the present embodiment, a specified time is set so that it can be determined that a risk of failure in the temperature sensor 9 is present and that consequently the output state of the heater 7 can be changed.

Hereinafter, it is assumed that the temperature sensor system fails at time t100 illustrated in FIG. 4 and that the measured temperature continues to be constant between the upper limit and the lower limit.

As illustrated in FIG. 4, at time t96, the measured temperature obtained by the temperature sensor 9 exceeds the upper limit. In the control taking place at time t96, first, controlling of the heater begins in step 1 of FIG. 3. In step 2, the temperature control unit 11 determines that the measured temperature obtained by the temperature sensor 9 is not lower than the lower limit, proceeding to step 5. In step 5, since the measured temperature obtained by the temperature sensor 9 exceeds the upper limit, the processing proceeds to step 6 where the heater 7 is turned OFF. In step 6, however, the heater output unit 15 turns the heater 7 OFF and at the same time initializes a timer. Thereafter, this control is ended in step 4. In addition, around time t96, a solenoid valve is opened by control using a temperature sensor installed separately for water-cooling, whereby the temperature of the base portion 129 is cooled by the water cooling pipe. However, since the temperature sensor for water-cooling and the temperature sensor for the heater are provided in different locations, the upper limit and the lower limit that are set for the water-cooling temperature sensor are typically slightly different from the upper limit and the lower limit that are set for the heater.

At time t97, the measured temperature obtained by the temperature sensor 9 overshoots and then becomes lower than the upper limit. Even after time t96, until time t97, the operation according to the flowchart of FIG. 3 is executed every sampling cycle Δt. Meanwhile, since the measured temperature obtained by the temperature sensor 9 stays above the upper limit, the heater 7 remains OFF in step 6. At this moment, the timer continues to count.

At time t98, the measured temperature obtained by the temperature sensor 9 is lower than the lower limit. Even after time t97, until time t98, the operation according to the flowchart of FIG. 3 is executed every sampling cycle Δt. At this moment, since it is determined in step 2 that the measured temperature obtained by the temperature sensor 9 is not lower than the lower limit, the processing proceeds to step 5. In step 5, it is determined that the measured temperature is not higher than the upper limit, and therefore the processing proceeds to step 7. In step 7, it is determined whether the count value of the timer indicates a predetermined specified time such as 90 minutes. It is preferred that this specified time of 90 minutes be determined by multiplying the time it takes for each pump to overheat or overcool by an allowance ratio of, for example, two, the time being calculated by experiments or the like.

The specified time is set in this manner in order to avoid problems such as overheating and overcooling that are caused due to constant heating by the heater 7 or constant cooling by the water cooling pipe in a case where the temperature sensor system fails and consequently the measured temperature continues to be constant between the upper limit and the lower limit.

The TMS function controls the measured temperature of the temperature sensor to a target temperature. Thus, if an application such as a target to be heated or a heater capacity is identified, the same cycles of turning ON/OFF of the heater or the water-cooling solenoid are repeated, and the upper limit of the time in which the ON/OFF state is sustained continuously is determined. It is preferred that an allowed time considering a margin be provided for this upper limit, and that the ON/OFF state be changed, so that the ON state or the OFF state is not continuously sustained beyond the allowed time.

In a case where the temperature sensor 9 operates normally, the specified time is not exceeded. Therefore, in step 7, it is determined that the count value of the timer is within the specified time, and the processing proceeds to step 4.

Even after time t97, until time t98, the operation according to the flowchart of FIG. 3 is executed every sampling cycle Δt.

At time t98, since it is determined in step 2 that the measured temperature obtained by the temperature sensor 9 is lower than the lower limit, the heater 7 is turned ON in step 3, and the control is ended in step 4. In step 3, however, the heater output unit 15 turns the heater 7 ON and at the same time initializes the timer. This initialization causes the timer to start counting again. Around time t98 as well, the water-cooling solenoid valve closes, causing the heater 7 to heat the base portion 129. In view of the heat capacity, the temperature of the base portion 129 does not rise rapidly even after the heater 7 is turned ON when the measured temperature indicates the lower limit, resulting in forming an undershoot curve.

In the sampling cycle Δt up to time t99 during which the undershoot continues, it is determined in step 2 that the measured temperature is lower than the lower limit. Thus, the processing proceeds to step 3 to continuously turn the heater 7 ON. At this moment, the timer keeps counting.

During the sampling cycle Δt up to time t100 after the undershoot, since it is determined in step 2 that the measured temperature is not lower than the lower limit and in step 5 that the measured temperature is not higher than the upper limit, the processing proceeds to step 7. Since the time on the timer is not expired in step 7, the processing proceeds to step 4. Therefore, the ON state of the heater 7 continues to be sustained.

Next is described processing that is executed when the temperature sensor system fails at time t100 and the measured temperature continues to be constant between the upper limit and the lower limit. At this time, the processing that is executed every sampling cycle Δt after time t100 proceeds to step 5 when it is determined in step 2 that the measured temperature is not lower than the lower limit, and proceeds to step 7 when it is determined in step 5 that the measured temperature is not higher than the upper limit. Since the time on the timer is not expired in step 7, the processing proceeds to step 4. Therefore, the ON state of the heater 7 continues for a long period of time. However, when it is determined in step 7 that the count value of the timer is equal to or greater than the specified time, the processing proceeds to step 8 to execute timer termination processing.

In the timer termination processing, the output state is forcibly inverted so that the same output state is not sustained for the specified time or longer. In other words, when the heater 7 is ON, then the heater 7 is turned OFF. However, subsequent to the timer termination processing, heating by the heater and cooling by the solenoid valve may be repeated alternately for each specified time. Alternatively, abnormality of the temperature sensor system may be notified without inverting the output state. Otherwise, abnormality may be notified at the same time of the inversion.

As described above, the risk of failure in the temperature sensor system between the two temperature thresholds of the upper limit and the lower limit is taken into consideration. Therefore, in a case where the temperature sensor system does not fail, the measured temperature always reaches the upper limit and the lower limit, and the output state is successfully inverted. On the other hand, in a case where the temperature sensor system fails, the measured temperature does not reach the upper limit or the lower limit even after the specified time passes. In such a case, however, the operation can be continued by inverting the output state, and the abnormality can be notified. Moreover, another temperature sensor for monitoring abnormality is not required in order to make the determination; the determination can be realized by means of software processing.

Although the present embodiment has described that one temperature sensor is provided for each of the heater and the water-cooling solenoid valve, the present disclosure is applicable to a situation where the heater and the water-cooling solenoid valve share one temperature sensor.

The above has also mainly described the control of the heater, but the present disclosure is applicable to control of the water-cooling solenoid valve. In such a case, the solenoid valve is opened when the measured temperature reaches the upper limit, to let the water flow into the water cooling pipe, and the solenoid valve is closed when the measured temperature reaches the lower limit, to stop the water.

Figure 5:
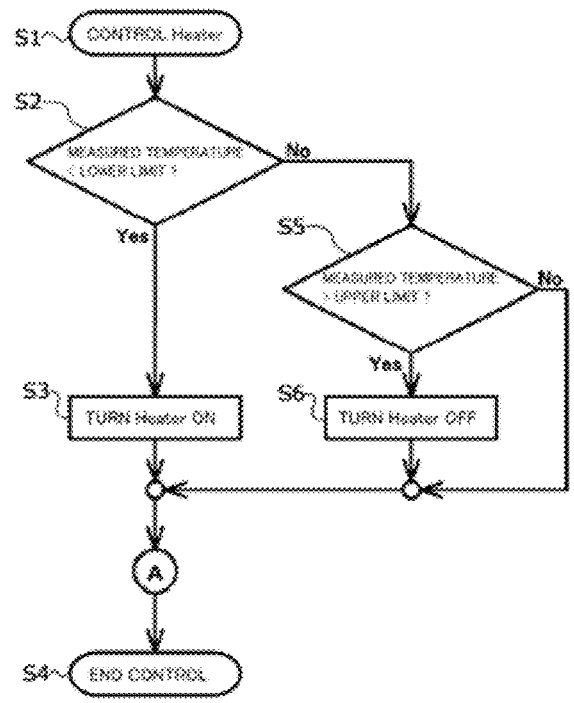
FIG. 5 is a flowchart of another aspect of the present embodiment (part 1).
Figure 6:
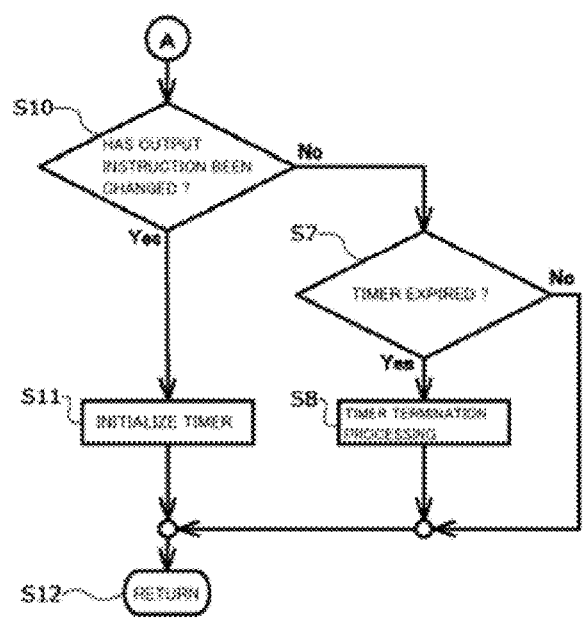
FIG. 6 is a flowchart of yet another aspect of the present embodiment (part 2).

Next, FIGS. 5 and 6 each illustrate a flowchart of another aspect of the present embodiment. Note that the same reference numerals are applied to the elements same as those illustrated in FIGS. 3 and 7; the overlapping descriptions are omitted accordingly.

FIG. 5 shows basically the same configuration as that of the flowchart illustrated in FIG. 7, but is different from FIG. 7 in that the subroutine for performing the timer processing illustrated in FIG. 6 is inserted into the part indicated by "A" between steps 3, 6, and 4. In other words, in FIG. 6, step 10 determines whether the output instruction of the heater 7 has been changed from ON to OFF or from OFF to ON. When it is determined that the output instruction of the heater 7 has been changed, the processing proceeds to step 11 to initialize the timer, and, in step 12, returns to the flowchart of FIG. 5.

On the other hand, when it is determined in step 10 that the output instruction of the heater 7 has not been changed, the processing proceeds to step 7. In step 7, it is determined whether the count value of the timer indicates the specified time or not. When it is determined in step 7 that the count value of the timer indicates the specified time or that the specified time has passed, the processing proceeds to step 8 to execute the timer termination processing described above.

As described above, not only is it conceivable that the risk of failure of the temperature sensor system arise between the two temperature thresholds of the upper limit and the lower limit, but also it is possible that the temperature sensor system fails in the areas where the measured temperature is lower than the lower limit and the areas where the measured temperature is higher than the upper limit.

It should be noted that the present disclosure can be modified in various ways without departing from the spirit of the present disclosure, and it goes without saying that the present disclosure extends to such modifications.

What is claimed is:

1. A vacuum pump, comprising:
   a temperature sensor that measures a temperature of the vacuum pump; and
   temperature control that controls a heater and/or a cooling device in such a manner that the temperature measured by the temperature sensor repeatedly changes back and forth towards an upper limit or a lower limit, wherein
   the temperature control has a specified time that is set so as to include an elapsed time in which the temperature changes from the upper limit to the lower limit and an elapsed time in which the temperature changes from the lower limit to the upper limit following said lower limit during a normal operation of the vacuum pump, and,
   when the specified time elapses after the measured temperature continues to be constant, the temperature control forcibly controls the heater and/or the cooling device to change the state and/or to notify abnormality.

2. The vacuum pump according to claim 1, wherein the specified time is set so as to include an elapsed time in which the temperature is lower than the lower limit, and an elapsed time in which the temperature exceeds the upper limit.

3. A temperature control device that controls an object to be temperature-controlled;
   a temperature sensor that measures a temperature of the object, and, so that the temperature measured by the temperature sensor repeatedly changes back and forth towards an upper limit or a lower limit, a heater and/or a cooling device, wherein
   the temperature control device has a specified time that is set so as to include an elapsed time in which the temperature changes from the upper limit to the lower limit and an elapsed time in which the temperature changes from the lower limit to the upper limit following said lower limit during a normal operation, and,
   when the specified time elapses after the measured temperature continues to be constant, the temperature control device forcibly controls the heater and/or the cooling device to change the state and/or to notify abnormality.

* * * * *